US006676078B2

(12) United States Patent
Cordina et al.

(10) Patent No.: US 6,676,078 B2
(45) Date of Patent: Jan. 13, 2004

(54) SYSTEM AND METHOD FOR ALERTING A COCKPIT CREW OF TERRORIST ACTIVITY

(75) Inventors: Joseph L. Cordina, Parker, TX (US); Anthony B. Couzelis, Plano, TX (US)

(73) Assignee: i-Tex Design Systems, Parker, TX (US)

( * ) Notice: Subject to any disclaimer, the term of this patent is extended or adjusted under 35 U.S.C. 154(b) by 15 days.

(21) Appl. No.: 10/017,547

(22) Filed: Dec. 14, 2001

(65) Prior Publication Data

US 2003/0062447 A1 Apr. 3, 2003

Related U.S. Application Data

(60) Provisional application No. 60/326,085, filed on Sep. 29, 2001.

(51) Int. Cl.[7] ................................................. B64D 47/00
(52) U.S. Cl. ..................... 244/118.5; 340/945; 340/541
(58) Field of Search .............................. 244/118.5, 1 R, 244/129.1; 340/945, 541

(56) References Cited

U.S. PATENT DOCUMENTS

| 3,704,845 | A | * | 12/1972 | Ord ............................ 244/121 |
|---|---|---|---|---|
| 4,112,818 | A | * | 9/1978 | Garehime, Jr. ................. 109/9 |
| 4,630,035 | A | | 12/1986 | Stahl et al. .................. 340/539 |
| 5,798,458 | A | * | 8/1998 | Monroe ........................ 73/587 |
| 6,009,365 | A | * | 12/1999 | Takahara et al. .............. 701/54 |
| 6,198,390 | B1 | * | 3/2001 | Schlager et al. ............ 340/539 |
| 6,246,320 | B1 | * | 6/2001 | Monroe ....................... 340/506 |
| 6,385,513 | B1 | * | 5/2002 | Murray et al. .............. 340/945 |
| 6,392,692 | B1 | * | 5/2002 | Monroe ....................... 340/506 |
| 2002/0004695 | A1 | * | 1/2002 | Glenn et al. .................. 701/35 |
| 2003/0052798 | A1 | * | 3/2003 | Hanson ....................... 340/945 |

* cited by examiner

*Primary Examiner*—J. Woodrow Eldred
(74) *Attorney, Agent, or Firm*—Michael L. Diaz

(57) ABSTRACT

A method and system for alerting a cockpit crew of terrorist activity in a cabin of an aircraft. The system includes a plurality of fobs worn by flight attendants. The system also includes an antenna sending unit (ASU) located within the cabin and a cockpit display unit (CDU) located in the cockpit of the aircraft. When a terrorist situation is detected by a flight attendant, the flight attendant sends an alerting signal to the cockpit by sending a coded signal via the ASU to the CDU. The CDU provides an indicator to the cockpit crew. The CDU may also optionally send a transponder code and an ACARS message to ground-based units.

17 Claims, 6 Drawing Sheets

SYSTEM AND METHOD FOR ALERTING A COCKPIT CREW OF TERRORIST ACTIVITY

RELATED APPLICATIONS

This utility application claims the priority date of Provisional Patent Application Ser. No. 60/326,085 filed Sep. 29, 2001 and is hereby incorporated by reference.

BACKGROUND OF THE INVENTION

1. Technical Field of the Invention

This invention relates to alerting systems and, more particularly, to a system and method for alerting a cockpit crew of terrorist activities occurring in a cabin of an aircraft.

2. Description of Related Art

The terrorist acts of Sep. 11, 2001 have changed commercial aviation. One of the primary reasons the hijackers of Sep. 11, 2001 were successful in overcoming the cockpit crew of four commercial airliners was the cockpit crew were caught off guard. During each of the incidents, the hijackers overcame some of the flight attendants without the cockpit crew being made aware of the situation. With a closed door dividing the aircraft cabin from the cockpit, most activity taking place within the cabin goes unmonitored by the cockpit crew. In most hijacks, such as those that occurred on Sep. 11, 2001, the hijackers easily overcame some of the flight attendants located in the aircrafts' cabins, allowing the hijackers to direct their efforts in overcoming the cockpit crew through surprise. Currently, the only means the flight attendants have with communicating any information to the cockpit crews is through fixed intercom devices located at flight attendant stations through the aircraft. However, if a flight attendant is not located near the flight attendant station, a flight attendant is unable to communicate with the cockpit crew. In addition, even if a flight attendant is located near a flight attendant station, the flight attendant may be unable to quickly and covertly communicate with the cockpit crew. Existing intercom systems only allow the flight attendants to chime the cockpit crew to alert the cockpit crew that the flight attendants desire to speak with them. The cockpit crew must then select the internal intercom on their headsets and respond to the flight attendants. Obviously, this process can be time consuming and useless during a hijacking.

In addition, even with access to the flight attendant station's intercom system, the flight attendant cannot covertly communicate with the cockpit crew. The flight attendant's actions in attempting to communicate with the cockpit crew cannot currently be concealed, causing many flight attendants to be reluctant in attempting to communicate with the cockpit crew during terrorist encounters. A system and method are needed which provides a simple, quick, and covert process for alerting the cockpit crew of any terrorist activities occurring within an aircraft's cabin.

Although there are no known prior art teachings of a solution to the aforementioned deficiency and shortcoming such as that disclosed herein, a prior art reference that discuss subject matter that bears some relation to matters discussed herein is U.S. Pat. No. 4,630,035 to Stahl et al. (Stahl).

Stahl discloses an alarm system for sensing an alarm condition within a relevant alarm area. The system includes one or more alarm units utilized for sensing an alarm condition. Each alarm unit includes a radio frequency transmitter for identifying the alarm unit and a secondary audio transmitter for defining the relevant alarm area. The system also includes a plurality of transponders. Each transponder includes a primary receiver for receiving a radio message sent from an alarm unit and a secondary receiver for receiving an audio signal from the alarm unit. A real-time clock is used to provide elapsed time between receipt of a primary and a secondary alarm signal by each transponder. The alerted transponder then transmits to a control unit a transponder address code, an alarm unit identification code and an elapsed time indicator. Based on the address code and the elapsed times detected by the control unit, the relevant alarm area can be determined. Although Stahl discloses an alerting system, Stahl does not teach or suggest a method of covertly informing a central area (i.e., cockpit deck) of a warning. Additionally, Stahl does not disclose utilizing such a warning system within an aircraft. Stahl also does not provide for transmitting several coded messages to indicate various types of situations to the control unit. Stahl merely provides a singular signal to the control unit.

Thus, it would be a distinct advantage to have a system and method which provide a plurality of distinct covert coded signals for alerting the cockpit crew of terrorist activities occurring within the cabin. In addition, it would be advantageous to have a system and method which also automatically informs ground-based controllers of any attempted terrorist activities. It is an object of the present invention to provide such a system and method.

SUMMARY OF THE INVENTION

In one aspect, the present invention is a system for alerting a cockpit crew of a dangerous situation occurring on an aircraft. The system includes a plurality of fobs. Each fob is carried by an authorized person located on the aircraft. The fob is a portable transmitter capable of sending a coded signal. A cockpit display unit (CDU) is provided for receiving signals sent from the transmitting fob. The CDU is located within a cockpit of the aircraft. When one of the authorized persons carrying the fob detects a dangerous situation, he may send a signal from the fob to the CDU. The CDU provides an indicator informing the cockpit crew of the dangerous situation.

In another aspect, the present invention is a method of alerting a cockpit crew located in an aircraft of a dangerous activity on the aircraft. The method begins with initializing a plurality of fobs to allow a cockpit display unit (CDU) located within a cockpit of the aircraft to recognize any signals transmitted by each initialized fob. Next, each initialized fob is carried by a flight crew member during the flight of the aircraft. A signal is transmitted from the fob to the CDU when a flight crew member detects a dangerous activity occurring aboard the aircraft. The CDU then displays an indication to the cockpit crew that a signal was sent from the fob.

In still another aspect, the present invention is a system for alerting a cockpit crew of a dangerous situation occurring on an aircraft. The system includes a plurality of fobs carried by a plurality of authorized personnel located on the aircraft. Each fob is capable of transmitting a plurality of codes correlating to specific conditions occurring on the aircraft as a signal. The system also includes a cockpit display unit (CDU) for receiving signals sent from a transmitting fob. The CDU is located within a cockpit of the aircraft. An antenna sending unit (ASU) located within a cabin of the aircraft relays any transmitted signals to the CDU. The system also relays the signal sent from the transmitting fob to ground-based personnel. When one of the authorized personnel detects a dangerous situation, a signal is sent through the fob to the CDU. The CDU then provides an indicator to the cockpit crew of the dangerous situation.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method for alerting a cockpit crew of terrorist activities.

Figure 1:
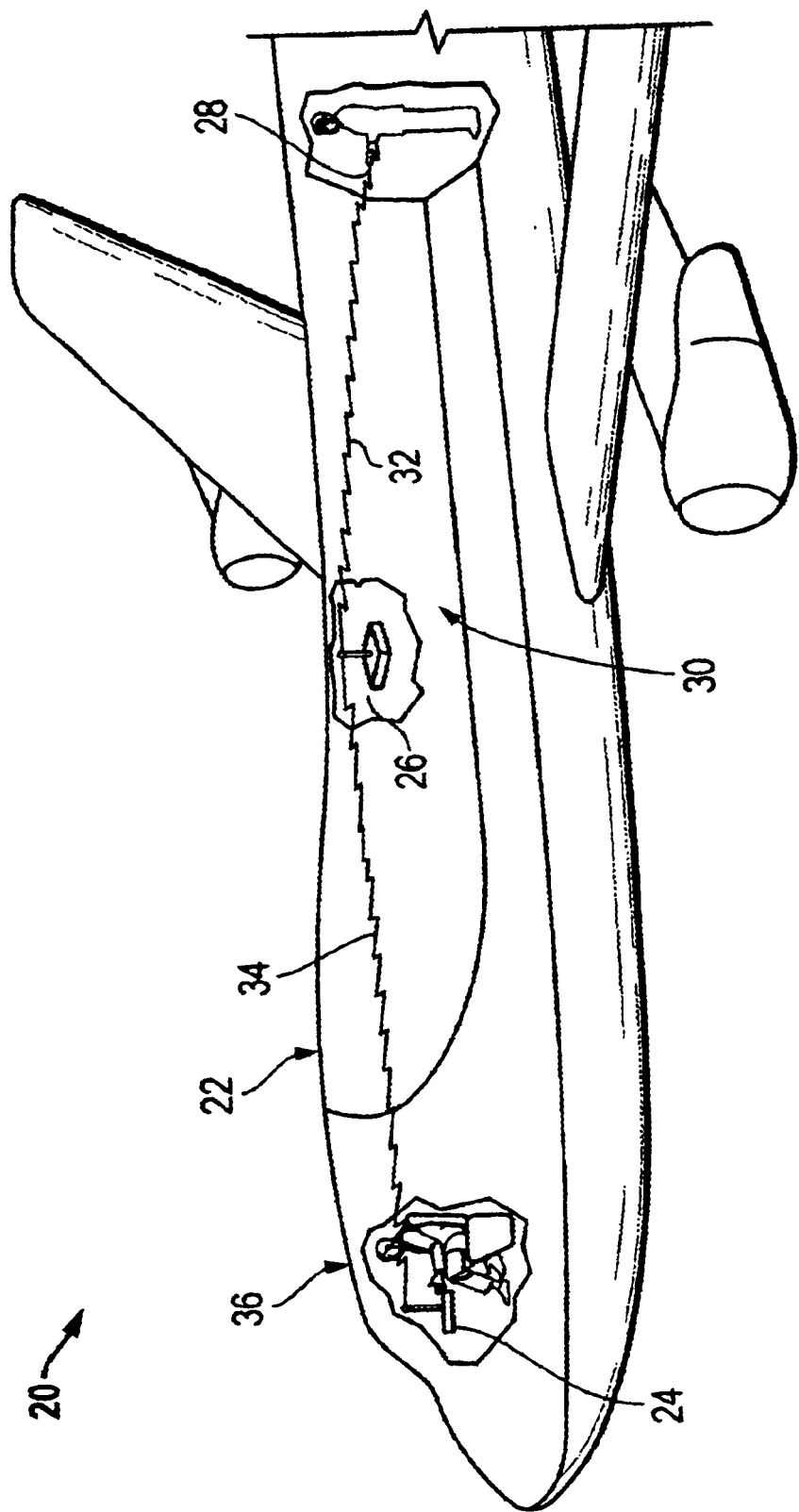
FIG. 1 is a simplified block diagram illustrating the components of an alert system in a preferred embodiment of the present invention.

FIG. 1 is a simplified block diagram illustrating the components of an alert system 20 in a preferred embodiment of the present invention. The alert system is installed on an aircraft 22 and includes a cockpit display unit (CDU) 24, at least one remote antenna sending unit (ASU) 26, and a plurality of fobs 28.

The plurality of fobs are devices carried by flight attendants within a passenger cabin area 30 and communicate with the ASU via a radio communications link 32. The ASU forwards any signals sent from any fob to the CDU via a radio communications link 34 located within a cockpit 36 where pilots control the aircraft 22. The CDU then provides a visual and aural warning to the cockpit for each received signal. The pilots may then take appropriate action to counteract any terrorist/hijacking attempt occurring on the aircraft.

Figure 2:
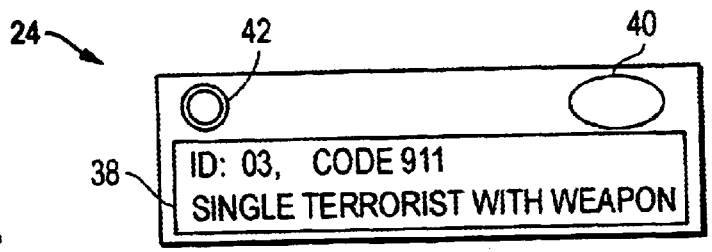
FIG. 2 is a front view of the CDU of FIG. 1 in the preferred embodiment of the present invention.

FIG. 2 is a front view of the CDU 24 of FIG. 1 in the preferred embodiment of the present invention. The CDU is a display unit having a receiver (not shown) for receiving any signals relayed from the ASU 26. Alternatively, the CDU may receive signals transmitted directly from a fob. The CDU is mounted within the cockpit 36 in such a position where the pilots may readily see any visual displays, such as the overhead panel of the cockpit. The CDU includes a visual display 38, a speaker 40, and a test/reset button 42.

The visual display may provide any symbology which may be used by the cockpit crew to indicate potential or actual dangerous situations occurring within the cabin area 30. In the preferred embodiment of the present invention, the visual display is a large, easily readable, backlit LCD having automatic dimming features common in many cockpit instruments. Preferably, the visual display will indicate a textual message for any received signal from the fobs or relayed through the ASU. For example, if an attempted hijacking is occurring, the visual display may indicate the specific fob sending the signal (e.g, "I.D. 03," the code sent (e.g, "911"), and the interpretation of the code (e.g., "single terrorist with weapon"). Additionally, the visual display may incorporate a "message-in-cue" feature which enables the pilot to view multiple messages sequentially by depressing the test/reset button 42.

The CDU 24 also may provide an optional audible alert emitted through the speaker 40. Any signal received from the CDU may actuate the audible alert to inform the pilots that a message is displayed on the visual display 38.

The CDU 24 may also provide a visual or aural display when any signals are detected by the ASU or CDU indicating that jamming or interference is being encountered. Any transmission received over a range near the frequency used by a transmitting fob may be detected through a receiver incorporated within the CDU. The CDU may also provide indications of a fob sending any erroneous unrecognized coded message, such as a nonsensical coded signal, such as may be transmitted by a malfunctioning fob.

The CDU may be installed anywhere within the cockpit, preferably through a cannon plug configuration well known in cockpit instrumentation. This configuration allows the simple removal and installation of the CDU, thus decreasing the on-site maintenance required within the cockpit. The CDU is preferably powered directly from the aircraft 22 through an auxiliary electric bus (AUX bus) installed on most aircraft, which remains powered in most situations. The CDU may also include an optional on/off switch (not shown), or automatically powered through the AUX bus.

The CDU 24 may also be wired to the aircraft's transponder system. The transponder provides a code to the air traffic control (ATC) system and its controllers and is used to identify and locate aircraft. A code may be selected in the transponder to indicate other emergency conditions, such as when an emergency occurs or when an aircraft has lost the use of its radios. However, if a signal from a fob is received by the CDU, the signal may be relayed to the transponder, which may transmit an appropriate emergency code automatically to ATC.

Additionally, the aircraft routinely communicates with ground-based operations centers (such as those established by individual airlines) through a system called ACARS. ACARS provides relevant information to the ground-based units, such as aircraft location, engine parameters, and manually selected messages sent between the pilots and the ground-based units. The CDU may also be linked with the ACARS to forward the same signals received by the CDU to the operations centers. The flight data recorder may also be connected to the CDU. The flight data recorder is normally used to store relevant aircraft parameters. The signals received by the CDU may also be stored within the memory of the flight data recorder.

The ASU is preferably located within a passenger cabin area 30, however, in alternate embodiments, the ASU may be located anywhere on the aircraft which allows communication with the plurality of fobs and the CDU.

The remote ASU 26 is preferably positioned within the cabin area 30, in such locations as allows reception of any fob's signals. In longer aircraft, such as the Boeing 777, a plurality of ASUs may be required to provide proper coverage of the entire cabin area. The ASU is preferably mounted at the ceiling within the cabin area. However, the ASU may be located anywhere which allows reception of the fobs. The ASU includes a receiver and a transmitter (not shown in FIG. 1). The receiver receives any transmitted signals from any fobs. The transmitter located within the ASU relays the received signals to the CDU 24 via the radio communications link 34.

Figure 3:
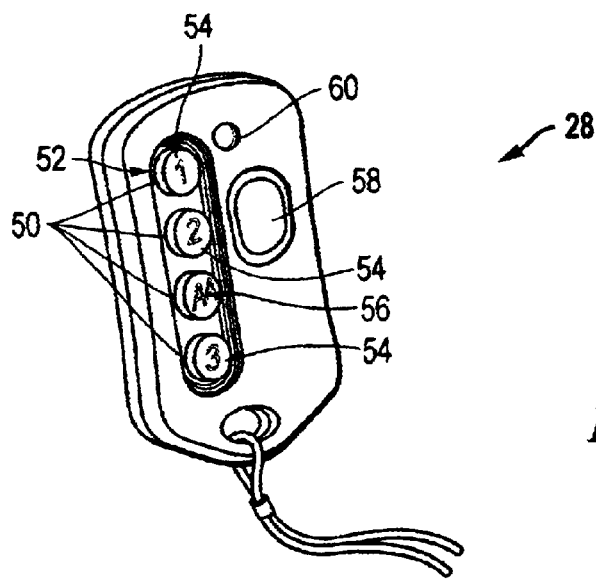
FIG. 3 is a front perspective view of the fob of FIG. 1 in the preferred embodiment of the present invention.

FIG. 3 is a front perspective view of the fob 28 in the preferred embodiment of the present invention. The fob includes five recessed elastomeric buttons 50 to prevent inadvertent actuation of the buttons. In the preferred embodiment of the present invention, the buttons may include four longitudinally arranged buttons 52 illustrating number buttons 54 and a raised emblem button 56. A send button 58 is offset next to the longitudinally arranged buttons. The buttons are configured in such a manner to allow the flight attendant to actuate the buttons without having to view the fob. The fob may also include a bicolored LED 60 to indicate when a valid activation code or transmission has occurred. If any invalid code is transmitted, the LED may indicate a red light, while a valid transmission may provide a green light. In order to transmit an emergency alert to the CDU, a specific sending sequence must be used. For example, the numbers "911" plus the send button must be depressed in the correct order to send an emergency code to the CDU.

The fob 28 may optionally include a staging feature which sends any signal transmitted from the fob in multiple repetitive signals at random spacing to the CDU. This staging feature is employed for use when multiple signals are simultaneous transmitted by different fobs, which, without the staging feature, could possibly result in blocking of one of the fob's sent signals.

Each fob may be initialized with the CDU during pre-flight, prior to boarding of passengers onto the aircraft 22. The fob may be initialized with the CDU by depressing the emblem button 56 and the send button. The CDU, which is placed in the test mode by depressing the test/reset button, receives a signal from the transmitting fob. The signal sent from the fob may provide data on the specific fob, allowing the CDU to recognize the fob's transmissions. The initialization of the fobs prevents misuse of unauthorized persons utilizing uninitialized fobs or from received fob signals transmitted from other aircraft.

The fob 28 is preferably powered by a small battery, such as a lithium coin cell battery. On a bottom side of the fob, each fob may include a bar code to provide identification of each fob. If the fobs are issued as personal items to each flight attendant, each fob may be associated through a code label upon the fob with a particular flight attendant.

Figure 4:
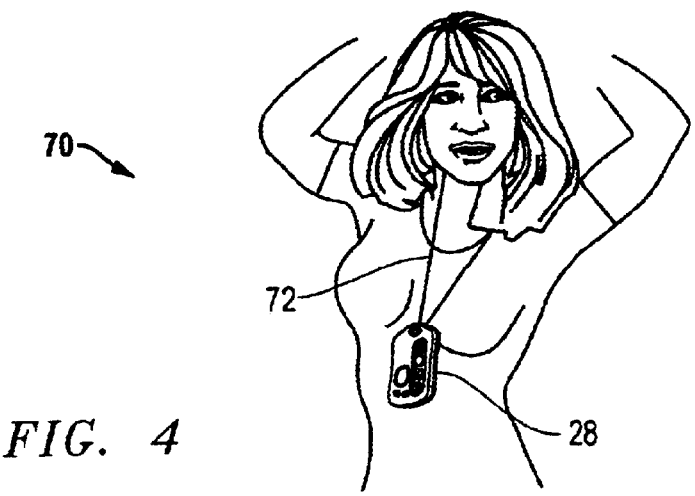
FIG. 4 is a front perspective view of a fob worn by a flight attendant in the preferred embodiment of the present invention.

FIG. 4 is a front perspective view of a fob 28 worn by a flight attendant 70 in the preferred embodiment of the present invention. The fob may be carried by the flight attendant by use of a lanyard 72 worn around the neck of the flight attendant. The fob may then be tucked under an apron or shirt of the flight attendant, to partially conceal the fob. The fob's appearance is very innocuous, having the appearance of an ordinary fob used in opening an automobile. However, the fob may be attached or carried by a flight attendant in any manner which allows the flight attendant to immediately actuate the buttons on the fob.

With reference to FIGS. 1–4, the operation of the alert system 20 will now be explained. Depending upon the procedures adopted at each commercial airline using the alert system 20, the fobs may be physically controlled in several different ways. The fobs may be issued prior to each trip (e.g., multiple flying legs accomplished during a single or consecutive days) for which the crew members would receive a fob. The fob may be issued by personnel located at a flight operations center or by a cockpit crew member, such as the aircraft commander. The fobs may alternatively be considered a controlled items issued to each crew member. The crew member would then be responsible for the fob. The fob's correctly assigned crew member could be established by correlating a bar code or serial number located on the back side of the fob. Prior to each flight, each fob is initialized with the CDU 24. The CDU is placed in the initialization mode by depressing the test/reset button 42. Each fob is initialized by depressing the emblem button 56 and the send button 58. The fob sends a specific signal to the CDU identifying the specific fob. The fob's identification is held within the memory of the CDU for a particular length of time, in most cases 12 hours. Therefore, if the flight attendant works the same aircraft 22 on a different flight, the fob does not require re-initialization. However, after the specified time has elapsed, the fob's identity is no longer recognized by the CDU. The dumping from the CDU's memory of the fob's identity automatically removes the fob from memory, thus eliminating the chance that the CDU associates the wrong fob with the aircraft.

Once the fob is initialized, the CDU, through the ASU, is able to accept signals from the initialized fobs. Typically, the fobs transmit a radio frequency (RF) signal (preferably within the 300 to 400 MHz range). However, any type of signal may be utilized which allows the transmission and receipt of coded signals aboard an aircraft. Additionally, the CDU may also receive any extraneous signal sent from an uninitialized fob or a device attempting to jam the RF signal sent from another transmitter unit, such as may be employed by terrorists attempting to jam any signal sent from a flight attendant's fob. The CDU may inform the cockpit crew of such extraneous signals.

In the preferred embodiment of the present invention, the ASU or the CDU may receive any signal received from any initialized fob. During the flight, all flight attendants carry their assigned fobs with them at all times. As discussed above, the fob may be carried around the neck of the flight attendant through the use of the lanyard 72. However, the fob may be carried in any fashion which allows quick access to the fob.

When any behavior for which a flight attendant deems to be hostile or belligerent by a passenger occurs, the flight attendant may then transmit a signal via the fob to the cockpit crew. In the preferred embodiment of the present invention, the flight attendant transmits a specific code for specific circumstances. For example, for a single terrorist aboard the aircraft, the flight attendant may send a "911" to the cockpit 36. If there are multiple terrorists present within the cabin area 30, the flight attendant may send a "912" code. Any code may be used which a flight attendant may easily remember to transmit during dangerous situations. In addition to sending the numeric code, the flight attendant may be required to depress the send button 58.

The ASU 26 receives the signal from the fob via the radio communications link 32 and forwards the signal via the radio communications link 34 to the CDU 24. The CDU may provide a visual indication on the visual display 38. For example, the visual display may indicate the specific fob transmitting a code, the code number, as well as a text message indicating the meaning of the code number (e.g., single terrorist). The radio links between the fob, ASU, and CDU may all be RF transmissions. Additionally, the speaker 40 may emit an aural signal which may be silenced by a push-to-silence button. If multiple signals are received by different fobs, the CDU stores each signal within a memory unit (not shown) integral to the CDU. A cockpit crew member may then depress the test/reset button 42 to display the next message held in cue within the memory unit of the CDU.

Additional, along with providing indicators to the cockpit, if a correctly sequenced code is received by the CDU, the CDU may optionally send a transponder code through the aircraft's transponder to ATC controllers. The CDU may also relay, via ACARS, the same signal displayed to the cockpit to the airlines operations center.

By determining that terrorist/hijacking attempts are occurring on the specific aircraft, steps can be taken early in the attempt to negate or diminish the damage done by the terrorists. Specifically, the cockpit crew may land the aircraft quickly or perform designated flight maneuvers to create difficulties for the terrorists in moving about the aircraft. In addition, ground-based units may prepare security forces to meet the landing aircraft 22. Also, fighter aircraft may be called upon to escort the aircraft.

If the flight attendant sends an unrecognized code, the CDU 24 may still display the received signal along with a text message indicating that an erroneous code or signal was sent, such as an "error" message. With such an error message, the cockpit crew may investigate further to determine the status within the cabin area 30.

Figure 5A:
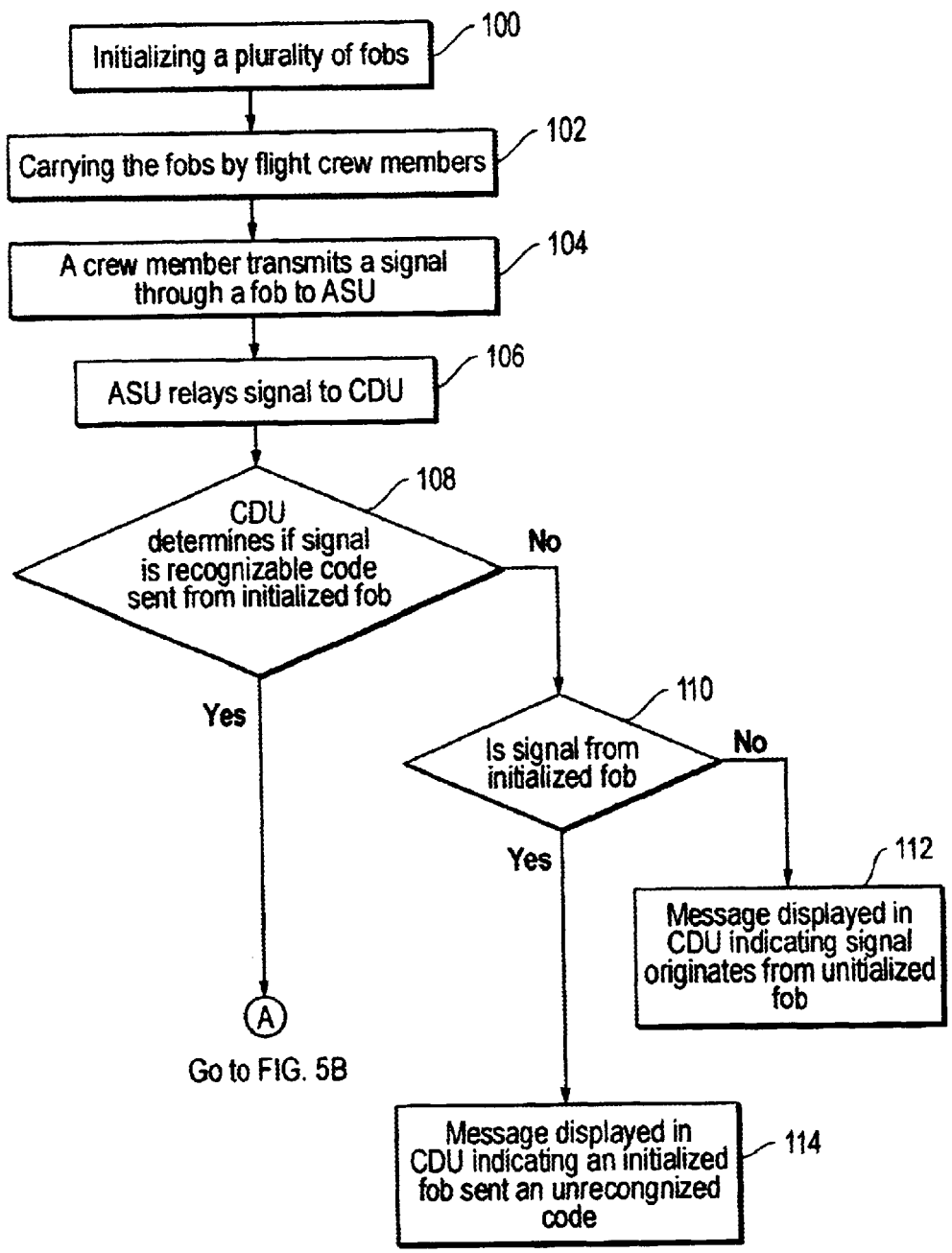
FIGS. 5A–5C are flow charts outlining the steps for alerting the cockpit crew of any terrorist activities on the aircraft according to the teachings of the present invention.
Figure 5B:
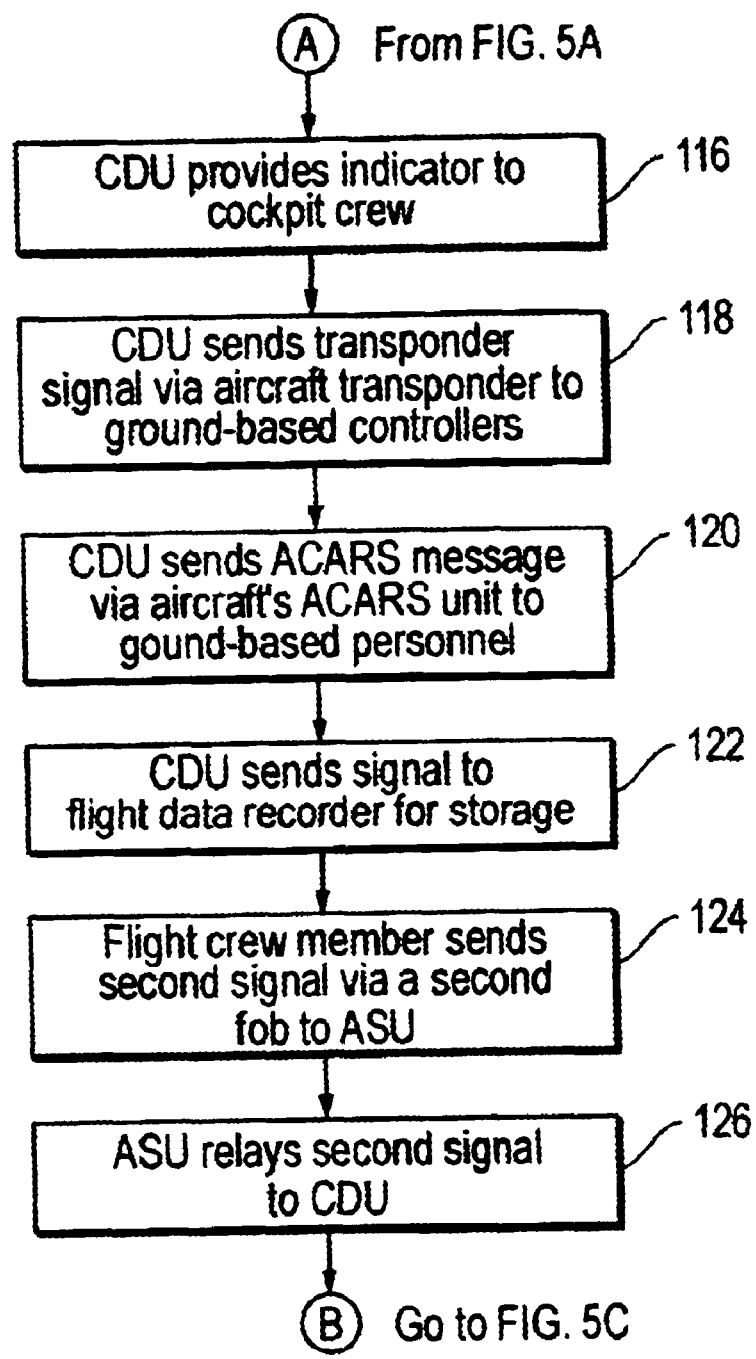
Figure 5C:
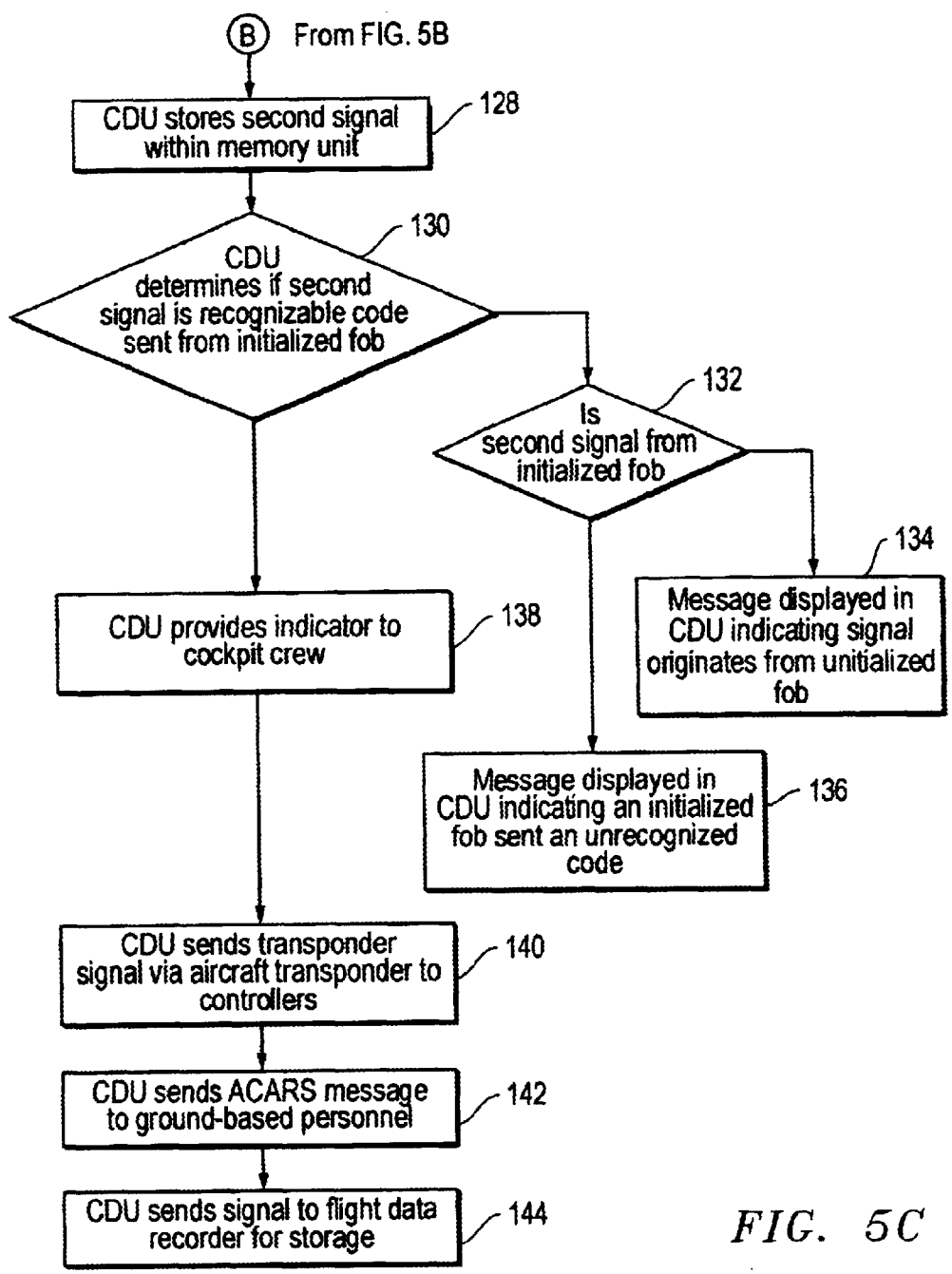

FIGS. 5A–5C are flow charts outlining the steps for alerting the cockpit crew of any terrorist activities on the aircraft 22 according to the teachings of the present invention. With reference to FIGS. 1–5, the steps of the method will now be explained. The method begins with step 100 where each fob 28 to be used on a flight for the aircraft 22 is initialized. The CDU is placed in the test mode by depressing the test/reset button, allowing receipt of the initialization code transmitted from each fob. The fob may be initialized with the CDU by depressing the emblem button 56 and the send button 58. The signal sent from the fob may provide data identifying the specific fob, which allows the CDU to recognize the fob as an authorized transmitter. The initialization of the fobs prevents misuse of unauthorized persons utilizing transmitters or from fob signals sent from other aircraft, thus eliminating any cross talk between closely positioned aircraft (e.g., located at adjacent gates at an airport terminal).

Next, in step 102, the fobs are carried by all flight attendants working within the cabin area 30. Preferably, each flight attendant carries their assigned fob by the lanyard 72, which is wrapped around the neck of the flight attendant. The fob may then be tucked under an apron or shirt to conceal the fob from view by passengers.

The method then moves to step 104 where a first flight attendant carrying an initialized fob 28 sends a first signal via the fob to the ASU 26 via the radio communications link 32. Next, in step 106, the ASU relays the received signal to the CDU via the radio communications link 34. The fob 28 may optionally include a staging feature which sends any signal transmitted from the fob in multiple repetitive signals at randomly timed spacing to the CDU, thus preventing possible blockage from other simultaneously transmitting fobs.

In step 108, it is determined by the CDU 24 whether the received signal originates from an initialized fob with a recognizable signal code. Alternatively, the ASU 26 may perform the function of determining if the received signal originates from an initialized fob with a recognizable signal code, prior to relaying the signal to the CDU. If it is determined in step 108 that the signal is not received from an initialized fob with a recognizable code, the method moves to step 110, where it is determined by the CDU if the received signal is from an initialized fob. If the signal is determined by the CDU to be from an uninitialized fob, the method moves to step 112 where the CDU provides an indicator to the cockpit crew that a signal was received from an uninitialized fob. The indicator may include an aural signal and a visual signal on the visual display 38. The visual indicator may also include a text message indicating the receipt of a signal from an uninitialized fob or jamming signal as appropriate.

However, if the CDU determines that the signal is from an initialized fob, the method moves from step 110 to step 114 where an indicator is sent to the cockpit crew that a signal was received from an initialized fob with an unrecognized code. The indicator may be an aural signal. In addition, the indicator may include a visual signal on the visual display 38 indicating that a signal was received from an initialized fob with an unrecognized code. The unrecognized code may optionally be displayed.

In addition, if it is determined by the CDU 24 that an initialized fob has sent a recognized code to the CDU, the method moves from step 108 to step 116, where the CDU provides an indicator to the cockpit crew. The indicator may be an aural signal, such as a tone emitting from the speaker 40. Additionally, a visual signal may be displayed on the visual display 38, indicating relevant information on the signal, such as the fob number, the code, and the meaning of the code.

In step 118, the CDU may optionally send a signal to a transponder to send a transponder code to the ATC system, indicating the situation on the aircraft, such as a particular code for a hijacking.

In step 120, the CDU may also optionally send an additional signal via the ACARS to the airline's operations center. The signal may be a replication of the indicator displayed to the cockpit crew. Next, in step 122, an optional signal may also be sent to the flight data recorder, which stores the signal received by the CDU.

Next, in step 124, a second flight attendant may optionally send a second signal to the ASU. In step 126, the ASU relays the received signal to the CDU 24. The method then moves to step 128, where the CDU stores the second signal within the memory unit of the CDU.

In step 130, it is determined by the CDU 24 whether the second signal is received from an initialized fob with a recognizable signal code. If it is determined in step 130 that the second signal is not received from an initialized fob with a recognizable code, the method moves to step 132, where it is determined by the CDU if the received signal originates from an initialized fob. If the signal is determined by the CDU to be from an uninitialized fob, the method moves to step 134 where the CDU provides an indicator to the cockpit crew that a signal was received from an uninitialized fob. The indicator may include an aural signal and a visual signal on the visual display 38. The visual indicator may also include a text message indicating the receipt of the unauthorized fob or jamming signal as appropriate. The indicator may be shown by depressing the test/reset button to step through to the second signal indicators.

However, if the CDU determines that the second signal is from an initialized fob, the method moves from step 132 to step 136 where an indicator is sent to the cockpit crew that a signal was received from an initialized fob with an unrecognized code. The indicator may be an aural signal. In addition, the indicator may be a visual signal displayed on the visual display 38 indicating that a signal was received from an initialized fob with an unrecognized code. The unrecognized code may optionally be displayed.

If it is determined by the CDU 24 that an initialized fob has sent a recognized code to the CDU, the method moves from step 130 to step 138, where the CDU provides an indicator to the cockpit crew. The indicator may be an aural signal, such as a tone emitting from the speaker 40. Additionally, a visual signal may be displayed on the visual display 38, indicating relevant information on the signal, such as the fob number, the code, and the meaning of the code. The visual signal may be retrieved by depressing the test/reset button 42 to sequence through the messages received by the CDU.

In step 140, the CDU may optionally send a signal to a transponder for transmittal of a transponder code to the ATC system indicating the situation on the aircraft, such as a particular code for a hijacking. In addition, in step 142, the CDU may also optionally send an additional signal via the ACARS to the airline's operations center. The signal may be a replication of the indicator displayed to the cockpit crew. Next, in step 144, an optional signal may also be sent to the flight data recorder storing the signal received by the CDU.

Figure 6:
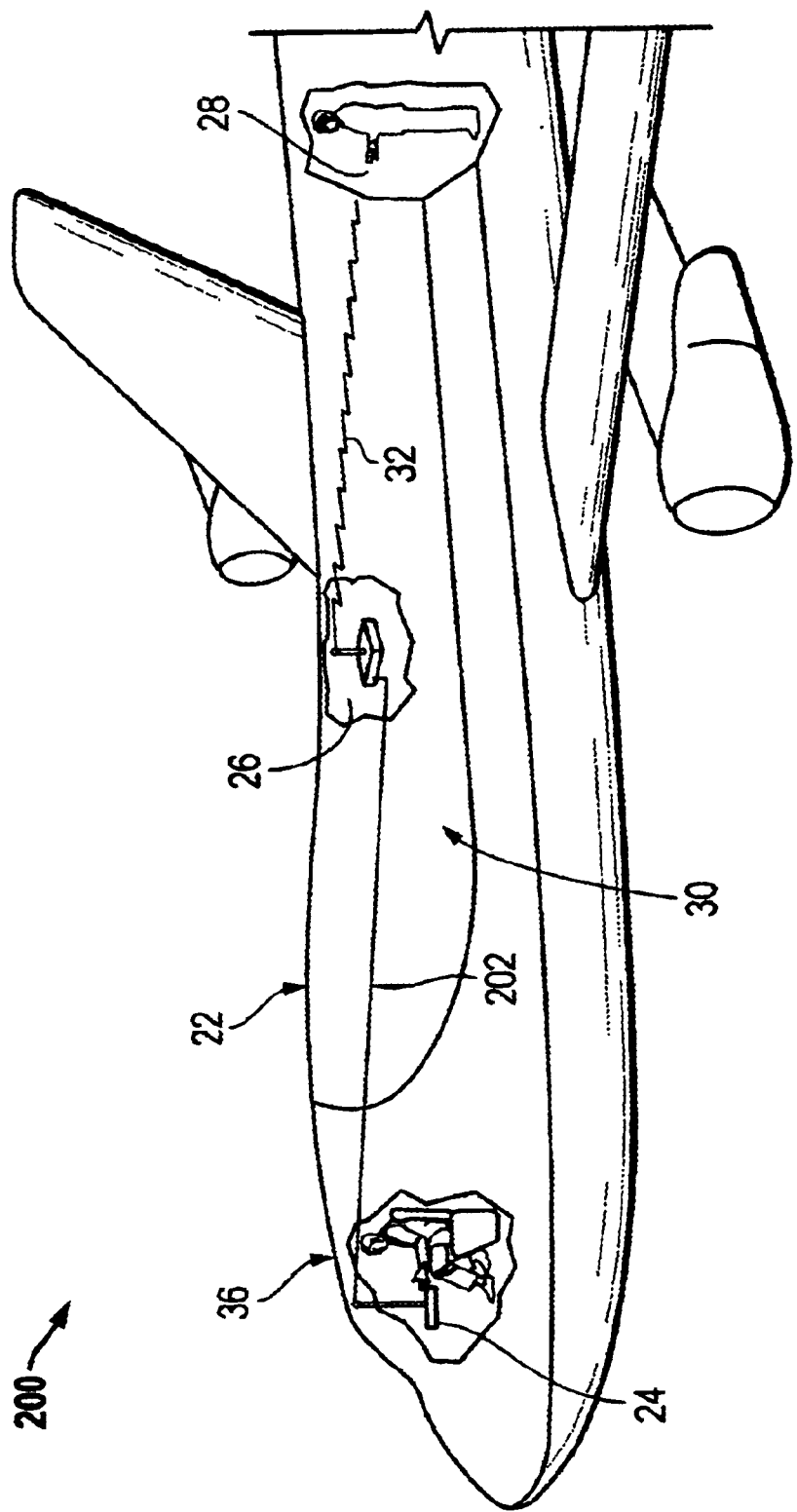
FIG. 6 is a simplified block diagram illustrating the components of an alert system in an alternate embodiment of the present invention.

FIG. 6 is a simplified block diagram illustrating the components of an alert system 200 in an alternate embodiment of the present invention. The alert system 200 is installed within the aircraft 22 and includes the CDU 24, ASU 26, and a plurality of fobs worn by the flight attendants working within the cabin area 30 of the aircraft 22. The alert system 200 is similar to the alert system 20, with the exception that the ASU 26 is connected via a wire connection 202 to the CDU 24. The wire connection 202 enables the ASU to relay any received signals to the CDU without utilizing a radio link, which may decrease the probability of successfully jamming the frequency used to transmit the signal received from the fob. The system 200 operates in the same fashion as discussed for the alert system 20, again with the exception of the wire connection 202.

The alert systems and their associated methodology may also utilize alternate embodiments and still remain within the scope of the disclosed invention. For example, the fobs may be issued to other personnel, such as deadheading crew members, company personnel, or air marshals. In addition, although a CDU is preferably utilized as a separate unit, the CDU may be incorporated into existing cockpit instrumentation, such as the flight management computer (FMC) utilized by most modern aircraft. Also, although the discussed fobs utilize a transmitted RF signal, any signal which may be remotely transmitted to the CDU may also be employed. The fobs may be any portable device capable of transmitting a signal to the ASU or directly to the CDU. It should also be understood that the functions of the CDU (e.g., determining if an initialized fob is sending a signal or if the signal is a recognized code, etc.) may be performed within the ASU. Additionally, the functions of the ASU may be performed by the CDU.

The disclosed invention provides may advantages over existing systems and methods. The disclosed invention provides a simple, economical method of alerting the cockpit crew of any hostile acts occurring within the aircraft. Additionally, the invention allows a flight attendant to remotely signal the cockpit without returning to a flight attendant station. Also, the signal may be transmitted covertly, thus decreasing the danger a flight attendant faces in sending the signal. The alert system also determines and warns the cockpit crew of any unauthorized signals from uninitialized fobs. In addition, the system alerts the cockpit crew of any jamming occurring upon the alert system. The alert system provides for indicating particular codes to the cockpit as well as automatically relaying the signals to ground units through the onboard communications systems of the aircraft.

It is thus believed that the operation and construction of the present invention will be apparent from the foregoing description. While the method and system shown and described have been characterized as being preferred, it will be readily apparent that various changes and modifications could be made therein without departing from the scope of the invention as defined in the following claims.

What is claimed is:

1. A system for alerting a cockpit crew of a dangerous situation created by a passenger within a cabin area of an aircraft, the system comprising:

a plurality of fobs, each fob being carried by an authorized person located on the aircraft, the fob capable of transmitting a plurality of selectable signals, each selectable signal providing specific information on the dangerous situation within the cabin area; and a cockpit display unit (CDU) for receiving signals sent from the transmitting fob, said CDU located within a cockpit of the aircraft, wherein said CDU includes means for detecting an attempt to jam a frequency used by the transmitting fob to send the signal to the CDU;

whereby one of the authorized persons carrying the fob detects a dangerous situation created by a passenger within the cabin area, selects a selectable signal from the plurality of selectable signals and sends the selected signal from the fob to said CDU, said CDU providing an indicator to the cockpit crew of the dangerous situation.

2. The system for alerting a cockpit crew of claim 1 further comprising an antenna sending unit (ASU) located within a cabin of the aircraft, said ASU capable of communicating with each fob, said ASU forwarding any transmitted signals to the CDU.

3. The system for alerting a cockpit crew of claim 2 wherein said ASU is connected to said CDU through a wire connection.

4. The system for alerting a cockpit crew of claim 2 wherein said ASU communicates with said CDU via a radio communications link.

5. The system for alerting a cockpit crew of claim 1 wherein each fob is capable of transmitting a plurality of specific codes, each code correlating to a specific type of dangerous situation occurring on the aircraft.

6. The system for alerting a cockpit crew of claim 5 wherein the specific codes transmitted by each fob include a numeric code to identify the specific type of dangerous situation.

7. The system for alerting a cockpit crew of claim 1 further comprising means for relaying the signal sent from the transmitting fob to ground-based personnel.

8. The system for alerting a cockpit crew of claim 7 wherein said means for relaying the signal includes emitting a transponder code from a transponder installed on the aircraft.

9. The system for alerting a cockpit crew of claim 7 wherein said means for relaying the signal includes sending an ACARS message from an ACARS unit installed on the aircraft to ground-based personnel.

10. The system for alerting a cockpit crew of claim 1 wherein said CDU includes:

means for storing a plurality of signals sent from different fobs; and means for the cockpit crew to select an indicator for a specific stored signal.

11. A system for alerting a cockpit crew of a dangerous situation created by a passenger within a cabin area of an aircraft, the system comprising:

a plurality of fobs, each fob being carried by an authorized person located on the aircraft, the fob capable of transmitting a plurality of selectable signals, each selectable signal providing specific information on the dangerous situation within the cabin area, wherein each fob includes a staging means providing multiple retransmission of the signal in a randomly timed spacing pattern; and a cockpit display unit (CDU) for receiving signals sent from the transmitting fob, said CDU located within a cockpit of the aircraft;

whereby one of the authorized persons carrying the fob detects a dangerous situation created by a passenger within the cabin area, selects a selectable signal from the plurality of selectable signals and sends the selected signal from the fob to said CDU, said CDU providing an indicator to the cockpit crew of the dangerous situation.

12. The system for alerting a cockpit crew of claim 11 further comprising means for initializing each fob used on the aircraft, said initializing means allowing said CDU to recognize only initialized fob signals.

13. A method of alerting a cockpit crew located in an aircraft of a dangerous activity created by a passenger within a cabin area on the aircraft, said method comprising the steps of:

initializing a plurality of fobs to allow a cockpit display unit (CDU) located within a cockpit of the aircraft to recognize any signals transmitted by each initialized fob;

carrying at least one fob by a flight crew member during flight of the aircraft, said fob capable of transmitting a plurality of selectable signals, each selectable signal providing specific information on the dangerous situation within the cabin area;

selecting a selectable signal from the plurality of selectable signals by the flight crew member;

transmitting a signal from the fob to the CDU, said signal being sent by the flight crew member when detecting a dangerous activity created by a passenger occurring within the cabin area of the aircraft, said signal providing specific information on the dangerous situation within the cabin area;

determining if the sent signal originated from an initialized fob;

providing an indication to the cockpit crew on the CDU that the signal originated from an uninitiated fob if the signal is determined to originate from an uninitiated fob; and displaying an indication on the CDU to the cockpit crew that a signal was sent from the fob.

14. The method of alerting a cockpit crew of claim 13 wherein the step of transmitting a signal to the CDU includes transmitting a coded signal associated with a specific condition occurring during the detected dangerous activity.

15. The method of alerting a cockpit crew of claim 13 wherein the step of transmitting a signal to the CDU includes the steps of:

transmitting a signal from the fob to an antenna sending unit (ASU) located on the aircraft; and relaying, by the ASU, the signal to the CDU.

16. The method of alerting a cockpit crew of claim 13 further comprising the step of sending through a transponder located on the aircraft a transponder code indicating that a terrorist activity has been detected on the aircraft.

17. The method of alerting a cockpit crew of claim 13 further comprising the step of sending through an ACARS unit installed on the aircraft to ground-based personnel an ACARS message indicating that terrorist activity has been detected aboard the aircraft.

* * * * *